(12) United States Patent
Yamada et al.

(10) Patent No.: US 8,844,192 B2
(45) Date of Patent: Sep. 30, 2014

(54) INSECT PEST-CONTROLLING APPARATUS

(75) Inventors: Makoto Yamada, Kadoma (JP); Masaki Ishiwata, Kadoma (JP)

(73) Assignee: Panasonic Corporation, Osaka (JP)

( * ) Notice: Subject to any disclaimer, the term of this patent is extended or adjusted under 35 U.S.C. 154(b) by 92 days.

(21) Appl. No.: 13/202,835

(22) PCT Filed: Feb. 18, 2010

(86) PCT No.: PCT/JP2010/052475
§ 371 (c)(1),
(2), (4) Date: Aug. 23, 2011

(87) PCT Pub. No.: WO2010/098252
PCT Pub. Date: Sep. 2, 2010

(65) Prior Publication Data
US 2011/0296740 A1 Dec. 8, 2011

(30) Foreign Application Priority Data

Feb. 24, 2009 (JP) ................................. 2009-040695
Feb. 24, 2009 (JP) ................................. 2009-040761

(51) Int. Cl.
*A01M 1/04* (2006.01)
*A01M 1/14* (2006.01)
*A01M 1/22* (2006.01)
*A01M 1/08* (2006.01)

(52) U.S. Cl.
CPC .................. *A01M 1/04* (2013.01); *A01M 1/145* (2013.01); *A01M 1/223* (2013.01); *A01M 1/08* (2013.01)
USPC .................................. 43/113; 43/107; 43/114

(58) Field of Classification Search
USPC ..................................... 43/113, 107, 114, 139
IPC .............................. A01M 1/10, 1/04, 1/02, 1/00
See application file for complete search history.

(56) References Cited

U.S. PATENT DOCUMENTS 4,826,729 A * 5/1989 Kitamura et al. .......... 428/411.1
5,353,542 A * 10/1994 Vaudry ........................... 43/113
(Continued)

FOREIGN PATENT DOCUMENTS

CN 2248978 3/1997
JP 2000-212007 8/2000
(Continued)

OTHER PUBLICATIONS

English-language translation of JP 2004-81100.*
(Continued)

*Primary Examiner* — Darren W Ark
*Assistant Examiner* — Lisa Tsang
(74) *Attorney, Agent, or Firm* — Greenblum & Bernstein, P.L.C.

(57) ABSTRACT

An insect pest-controlling apparatus (1) includes a light-reflecting attraction unit (4) that reflects sunlight and a trap (6) to trap insects attracted to light reflected by the light-reflecting attraction unit (4). The light-reflecting attraction unit (4) is a reflector whose reflectance of 220 to 390 nm light wavelength components is 5% or less. Because the light-reflecting attraction unit (4) reflects almost no ultraviolet rays, the contrast of ultraviolet rays is increased in the space compared with sunlight by the insect pest-controlling apparatus (1) and diurnal agricultural insect pests are strongly attracted to the light-reflecting attraction unit (4). Accordingly, diurnal agricultural insect pests can be attracted and trapped in large quantities in the daytime.

7 Claims, 5 Drawing Sheets

(56) References Cited

U.S. PATENT DOCUMENTS

| | | | |
|---|---|---|---|
| 5,607,711 A * | 3/1997 | Lagunas-Solar | 426/248 |
| 5,915,948 A * | 6/1999 | Kunze et al. | 43/114 |
| 2008/0141578 A1* | 6/2008 | Chen et al. | 43/113 |
| 2010/0229459 A1* | 9/2010 | Simchoni-Barak et al. | 43/112 |

FOREIGN PATENT DOCUMENTS

| | | | | |
|---|---|---|---|---|
| JP | 2001-28947 | | 2/2001 | |
| JP | 2002-20213 | | 1/2002 | |
| JP | 2004081100 A | * | 3/2004 | A01G 7/00 |
| JP | 3-541217 | | 4/2004 | |
| JP | 2004-261180 | | 9/2004 | |
| JP | 2004-275069 | | 10/2004 | |
| JP | 2005151868 A | * | 6/2005 | A01M 1/04 |
| JP | 2006-25673 | | 2/2006 | |
| JP | 2007-291361 | | 11/2007 | |
| JP | 2008-34350 | | 2/2008 | |
| JP | 4-197969 | | 10/2008 | |

OTHER PUBLICATIONS

English-language translation of JP 2005-151868.*

Mo Jianchu, "Pest Control for Urban Landscaping", Chemical Industry press (Jan. 2008) with Partial English translation.

* cited by examiner

INSECT PEST-CONTROLLING APPARATUS

FIELD OF THE INVENTION

The present invention relates to an insect pest-controlling apparatus including a light irradiation unit that emits light containing ultraviolet rays.

DESCRIPTION OF THE RELATED ART

Conventionally, a lighting apparatus for trapping insect pests including a light source to emit light containing ultraviolet rays has been known (refer to Japanese Patent No. 4197969, for example). This apparatus attracts and traps insects (insect pests) that are phototactic with respect to light by emitting light containing ultraviolet rays. Ultraviolet rays emitted from the light source is UV-A (wavelength component: 320 to 380 nm), which has a peak wavelength in the wavelength range of 350 to 375 nm fitted to phototaxis of insects.

Light emitted from the apparatus is effective in attracting insect pests in the nighttime, but is not suitable for attracting insects in agriculture that are active in the daytime and hardly active in the nighttime (hereinafter, referred to as diurnal agricultural insect pests) such as aleyrods, thrips, agromyz, and shield bugs, because the light has a low quantity of UV-A in ultraviolet rays wavelength component compared with sunlight. That is, if the apparatus is used in the daytime, diurnal agricultural insect pests cannot be caused to visually recognize the contrast of ultraviolet rays and so diurnal agricultural insect pests cannot be trapped in large quantities.

Also, an insect pest trapping apparatus including a color reflector and pheromones is known (refer to Japanese Patent No. 3541217, for example). The apparatus attracts and traps diurnal agricultural insect pests in the daytime by a combination of visible light contained in the sunlight reflected by the color reflector and aggregation pheromone contained in the pheromones.

However, because a commercial color reflector has low attraction performance, the apparatus cannot attract a large number of diurnal agricultural insect pests in the daytime and thus, the apparatus cannot be used as an insect pest-controlling apparatus and can be used only as a monitoring apparatus. Further, because aggregation pheromone contained in the pheromones attracts only specific diurnal agricultural insect pests and thus, the apparatus cannot attract diurnal agricultural insect pests in large quantities.

DISCLOSURE OF THE INVENTION

The present invention has been made to solve the above problems and an object thereof is to provide an insect pest-controlling apparatus capable of attracting and trapping a large number of diurnal agricultural insect pests in the daytime in which such insects are active.

An insect pest-controlling apparatus according to an aspect of the present invention includes a light-reflecting attraction unit that reflects sunlight and a trap to trap insects attracted by light reflected by the light-reflecting attraction unit, wherein the light-reflecting attraction unit comprises a reflector whose reflectance of 220 to 390 nm light wavelength components is 5% or less.

According to this configuration, the light-reflecting attraction unit reflects almost no ultraviolet rays and thus, the contrast of ultraviolet rays is increased in the space compared with sunlight and diurnal agricultural insect pests are strongly attracted to the light-reflecting attraction unit. Accordingly, diurnal agricultural insect pests can be attracted and trapped in large quantities in the daytime.

In the insect pest-controlling apparatus, the light-reflecting attraction unit may further be the reflector whose transmittance near a transmittance peak wavelength of the light wavelength components of 380 to 600 nm is 10% or more.

According to this configuration, visible light is emitted from the side of the light-reflecting attraction unit on which the sun is not faced after the light-reflecting attraction unit being transmitted by sunlight and so diurnal agricultural insect pests can be attracted also on the side on which the sun is not faced. Accordingly, diurnal agricultural insect pests can be attracted and trapped in larger quantities in the daytime.

The insect pest-controlling apparatus may further include an odor generation unit that generates an odor to attract the insects, wherein the odor generation unit uses an aqueous solution containing at least one of green leaf alcohol and green leaf aldehyde as an odor source.

According to this configuration, an odor generated by the odor generation unit attracts diurnal agricultural insect pests from places away from the range in which diurnal agricultural insect pests can visually recognize the contrast of ultraviolet rays by the odor generated by the odor generation unit and therefore, diurnal agricultural insect pests can be attracted and trapped in larger quantities in the daytime.

The insect pest-controlling apparatus may further include a light irradiation unit that emits the light to attract the insects, wherein the light irradiation unit emits the light of at least a region of a wavelength range of 250 to 330 nm.

According to this configuration, the light emitted from the light irradiation unit contains light wavelength components that are not contained in sunlight and also light wavelength components that are contained in sunlight, but whose radiation is weak and therefore, diurnal agricultural insect pests are able to visually recognize the contrast of ultraviolet rays even under sunlight. Accordingly, diurnal agricultural insect pests can be attracted and trapped in larger quantities in the daytime.

In the insect pest-controlling apparatus, the light irradiation unit may be controlled so that a total quantity of the light in the wavelength range of 250 to 330 nm on an emission surface is 100 $\mu W/cm^2$ or more.

According to this configuration, diurnal agricultural insect pests are able to visually recognize the contrast of ultraviolet rays strongly even under sunlight and therefore, diurnal agricultural insect pests can be attracted efficiently.

The insect pest-controlling apparatus may further include a filter that controls wavelength of light from the light irradiation unit, wherein the filter is configured so that the light wavelength components of 340 to 380 nm of the light emitted from the light irradiation unit are not transmitted.

According to this configuration, plants are not irradiated with light wavelength components of 340 to 380 nm that promote a hyphal elongation of filamentous fungi (mold) such as gray mold so that plant disease can be controlled.

An insect pest-controlling apparatus according to another aspect of the present invention includes a light irradiation unit that emits light to attract insects and a trap that traps the insects attracted by the light emitted from the light irradiation unit, wherein the light irradiation unit emits the light of at least a region of a wavelength range of 250 to 330 nm.

According to this configuration, the light emitted from the light irradiation unit contains light wavelength components that are not contained in sunlight and also light wavelength components that are contained in sunlight, but whose radiation is weak and therefore, diurnal agricultural insect pests are able to visually recognize the contrast of ultraviolet rays even under sunlight. Accordingly, diurnal agricultural insect pests can be attracted and trapped in larger quantities in the daytime.

The insect pest-controlling apparatus may further include an odor generation unit that generates an odor to attract the insects, wherein the odor generation unit uses an aqueous solution containing at least one of green leaf alcohol and green leaf aldehyde as an odor source.

According to this configuration, an odor generated by the odor generation unit attracts diurnal agricultural insect pests from places away from the range in which diurnal agricultural insect pests can visually recognize the contrast of ultraviolet rays by the odor generated by the odor generation unit and therefore, diurnal agricultural insect pests can be attracted and trapped in larger quantities in the daytime.

BRIEF DESCRIPTION OF THE DRAWINGS

FIG. 1 is an external view of an insect pest-controlling apparatus according to an embodiment of the present invention.

FIG. 2 is a diagram showing a UV-B lamp used as a light irradiation unit of the insect pest-controlling apparatus, phototaxis of insects, and a spectral distribution of sunlight.

FIG. 3 is a partial sectional view of a fluorescent lamp used as the light irradiation unit of the insect pest-controlling apparatus.

[FIG. 4]

FIG. 5 is a diagram showing another arrangement example of the light irradiation unit of the insect pest-controlling apparatus.

FIG. 6 is a diagram showing still another arrangement example of the light irradiation unit of the insect pest-controlling apparatus.

DESCRIPTION OF THE PREFERRED EMBODIMENTS

Figure 1:
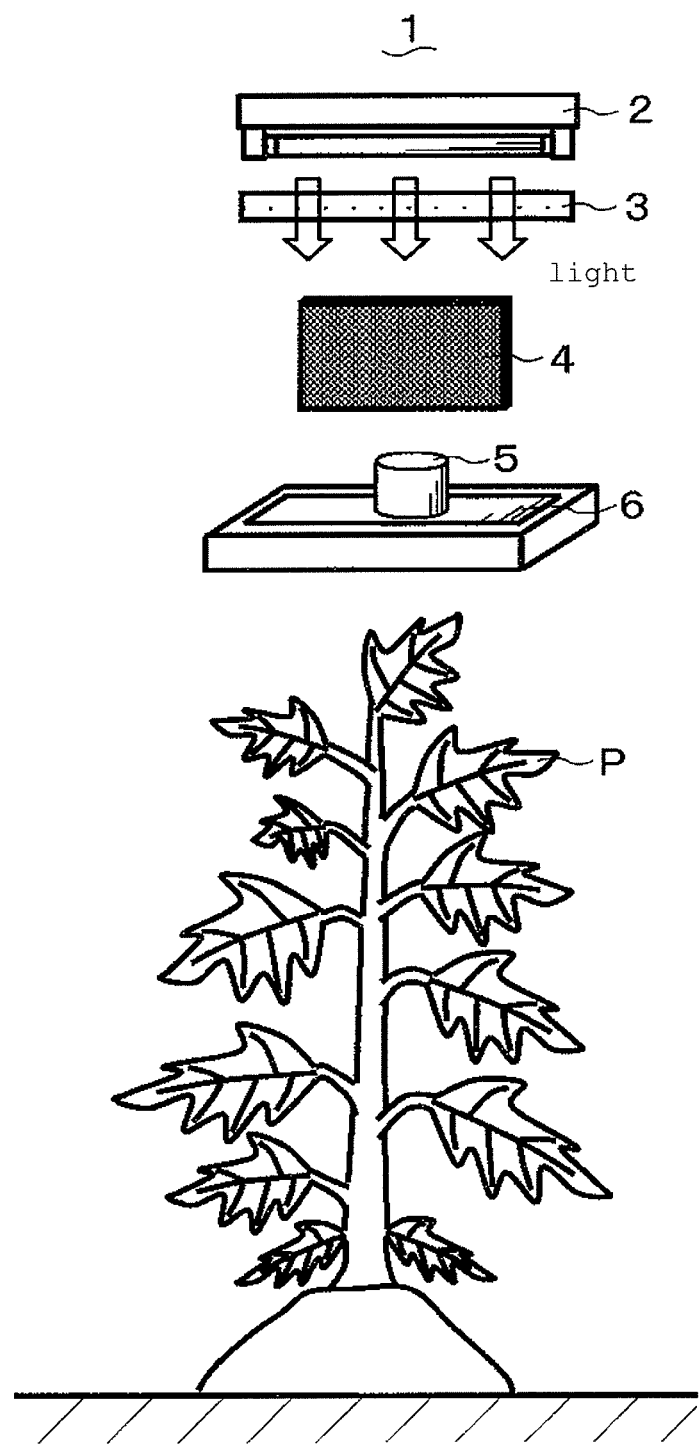
[FIG. 1]

An insect pest-controlling apparatus according to an embodiment of the present invention will be described with reference to drawings. FIG. 1 shows the configuration of an insect pest-controlling apparatus 1 according to the present embodiment. The insect pest-controlling apparatus 1 is used to control diurnal agricultural insect pests whose outbreak occurs when seedlings of vegetables or ornamental flowers are grown in facility cultivation such as a plastic greenhouse and glass house for agriculture or open culture.

The insect pest-controlling apparatus 1 includes a light irradiation unit 2 that irradiates a plant P cultivated in a seedbed with light, a filter 3 that controls wavelength of light from the light irradiation unit 2, a light-reflecting attraction unit 4 that reflects light from the light irradiation unit 2 and sunlight, an odor generation unit 5 that generates an odor attracting diurnal agricultural insect pests, and a trap 6 that traps attracted diurnal agricultural insect pests. The light irradiation unit 2, the light-reflecting attraction unit 4, and the odor generation unit 5 are provided near the trap 6 so that attracted diurnal agricultural insect pests can easily be trapped. The insect pest-controlling apparatus 1 is placed above the plant P with the aid of a support post or the like so that diurnal agricultural insect pests located in a distant place are more likely to be attracted by light emitted from the light irradiation unit 2.

Figure 2:
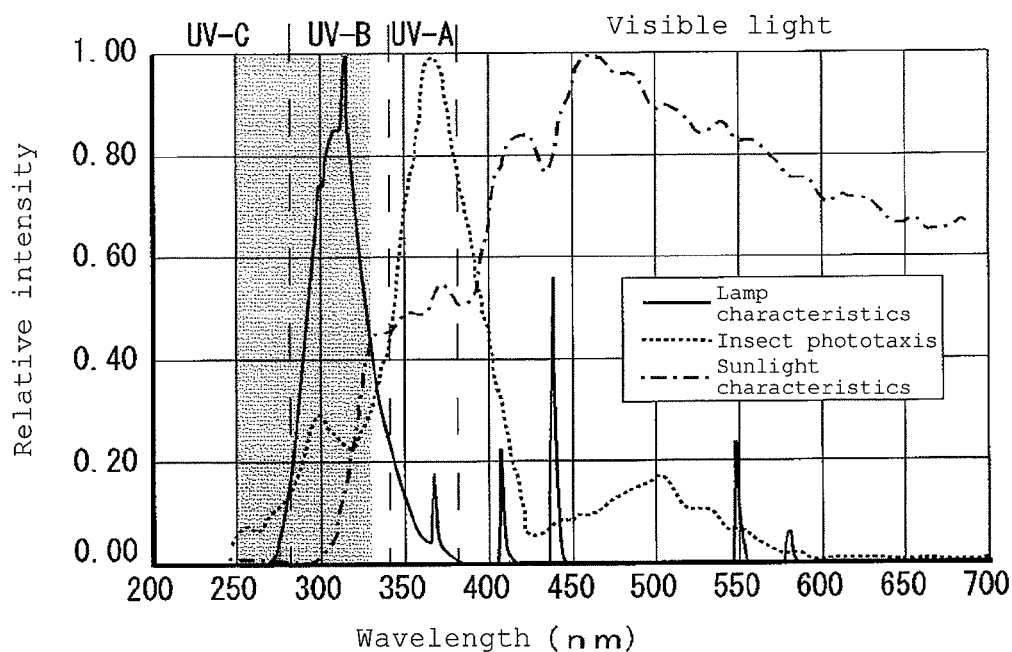
[FIG. 2]

The light irradiation unit 2 is a fluorescent lamp, HID lamp or the like that emits light containing at least a portion of wavelength components of the wavelength range of 250 to 330 nm and is constituted of, for example, a UV-B lamp of the fluorescent lamp having lamp characteristics as shown, for example, in FIG. 2. The colored region in FIG. 2, which is the wavelength range of 250 to 330 nm, contains a wavelength range of light that is not contained in sunlight and a wavelength range of light, though contained in sunlight, whose irradiance is small and also a wavelength range of light with phototaxis of insects.

If the light irradiation unit 2 is a fluorescent lamp, a UV-B lamp (manufactured by Panasonic Electric Works Co., Ltd., product number: YGRKX21799 or manufactured by Sankyo Denki Co., Ltd., product number: GL20E) capable of actively emitting light in the wavelength range of 250 to 330 nm is used. If the light irradiation unit 2 is an HID lamp, a mercury lamp or metal halide lamp (manufactured by Panasonic Corporation, Sky beam) having a large quantity of ultraviolet radiation components in the wavelength range of 250 to 330 nm, a xenon lamp having a continuous emission spectrum in the UV range, or an LED or the like having emission characteristics in 250 to 330 nm.

Light emitted from the light irradiation unit 2 is controlled so that the total quantity of light in the wavelength range of 250 to 330 nm on the emission surface of the light irradiation unit 2 is 100 $\mu W/cm^2$ or more. With this control, the insect pest-controlling apparatus 1 can cause diurnal agricultural insect pests to visually recognize the contrast of ultraviolet rays even under sunlight so that diurnal agricultural insect pests can efficiently be attracted.

The method of controlling the total quantity of light in the wavelength range of 250 to 330 nm on the emission surface of the light irradiation unit 2 becomes 100 $\mu W/cm^2$ or more is configured by, for example, a light controller (not shown). The light irradiation unit 2 is electrically controlled by the light controller. The configuration of the control method is not limited to this and, for example, a coated film or an evaporated film formed on the filter 3 or the light irradiation unit 2 or a combination thereof may be used for the control.

The filter 3 is made of glass or resin as a material and provided between the plant P, which is an irradiation target of the light emitted from the light irradiation unit 2 and the light irradiation unit 2. The filter 3 is configured so that UV-A, that is, the light wavelength components of 340 to 380 nm of the light emitted from the light irradiation unit 2 is not transmitted. Thus, the light with which the plant P is irradiated from the light irradiation unit 2 contains substantially 0 light wavelength component of 340 to 380 nm after the component being cut by the filter 3. By cutting the light wavelength components of 340 to 380 nm of the light emitted from the light irradiation unit 2 to substantially 0, the insect pest-controlling apparatus 1 does not promote a hyphal elongation of filamentous fungi (mold) such as gray mold so that plant disease can be controlled. The filter 3 is effective when a metal halide lamp, xenon lamp or the like having a relatively large quantity of luminous flux and containing a relatively large quantity of light in the UV range of 250 to 330 nm is used as the light irradiation unit 2.

As another method of exercising control so that the light wavelength component of 340 to 380 nm becomes substantially 0, the light wavelength component of 340 to 380 nm may be cut, in addition to using the filter 3, by the same method as the above method of controlling the total quantity of light in the wavelength range of 250 to 330 nm on the emission surface of the light irradiation unit 2.

Figure 3:
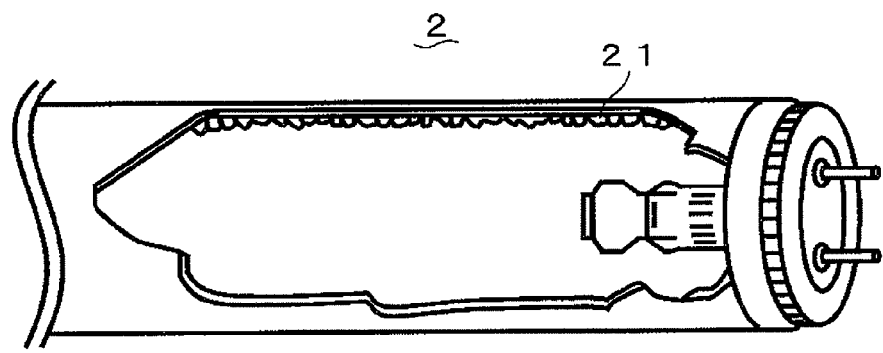
[FIG. 3]

As shown in FIG. 3, the light irradiation unit 2 may be a fluorescent lamp that emits electrons by electrical discharge, emits ultraviolet rays by energy of the electrons being received by mercury atoms, and emits light by the ultraviolet rays being absorbed by a fluorescent material 21.

The light irradiation unit 2 configured by the fluorescent lamp may be configured to cut the light wavelength component of 340 to 380 nm by using the fluorescent material 21 that emits much in the wavelength range of 250 to 330 nm and does not emit in the wavelength range of 340 to 380 nm.

The light-reflecting attraction unit 4 is a reflector (hereinafter, referred to as a low-UV reflector) whose reflectance of light wavelength components of 220 to 390 nm is 5% or less and is arranged perpendicular to the ground within the range of irradiation of the light from the light irradiation unit 2. With the light-reflecting attraction unit 4 being arranged within the range of irradiation of the light from the light irradiation unit 2, the contrast of ultraviolet rays with respect to the space in a field is increased when viewed from diurnal agricultural insect pests and so an attraction effect is improved. The light-reflecting attraction unit 4 may be arranged horizontally with respect to the ground.

More specifically, the light-reflecting attraction unit 4 is configured by performing low-reflection treatment of the surface of a color reflector (an azo or quinophthalone material for yellow or a phthalocyanine or cobalt material for blue) to control the reflectance of light wavelength components of 220 to 390 nm to 5% or less. Favored colors of the visible light range depend on diurnal agricultural insect pests and the light-reflecting attraction unit 4 attracts aleyrods, agromyz, or the like when the surface thereof is yellow and thrips or the like when the surface thereof is blue.

Figure 4A:
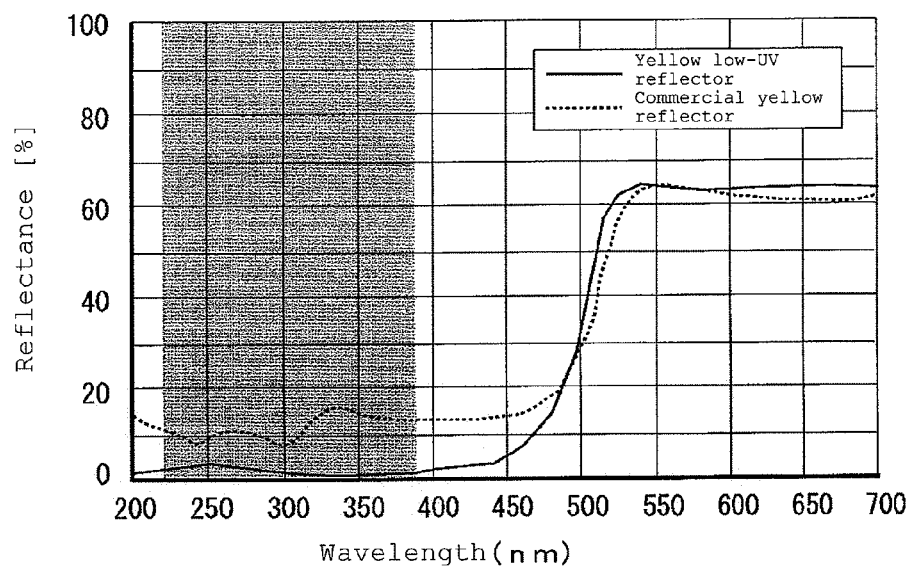
FIG. 4a is a graph showing each reflectance of a yellow low-UV reflector of the insect pest-controlling apparatus and a commercial yellow reflector and FIG. 4b is a graph showing each reflectance of a blue low-UV reflector of the insect pest-controlling apparatus and a commercial blue reflector.
Figure 4B:
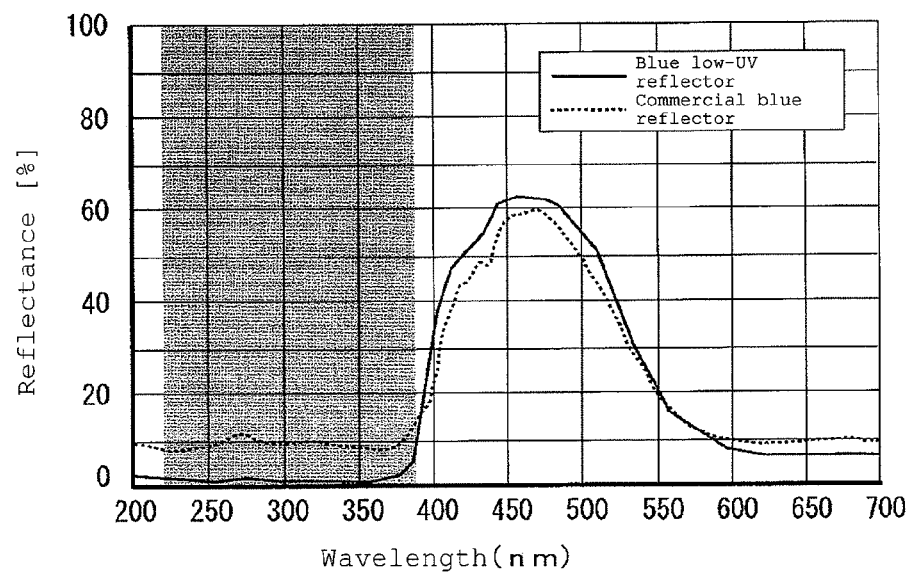

A low-UV reflector as the light-reflecting attraction unit 4 whose surface is yellow is configured, as shown in FIG. 4a, to have a lower reflectance in the wavelength range of 220 to 390 nm, which is the colored range in the graph, compared with a commercial reflector whose surface is yellow (hereinafter, referred to as a commercial yellow reflector). Similarly, a low-UV reflector as the light-reflecting attraction unit 4 whose surface is blue is configured, as shown in FIG. 4B, to have a lower reflectance in the wavelength range of 220 to 390 nm, which is the colored range in the graph, compared with a commercial reflector whose surface is blue (hereinafter, referred to as a commercial blue reflector).

The material of a color reflector constituting the light-reflecting attraction unit 4 is not limited, but is desirably constituted of color plastics, a plastic plate or sheet coated with color. Low-reflection treatment is performed by providing a film or multilayer film of low-reflection material (such as a fluorine material) on the surface of a color reflector or providing jaggednesses of about 400 nm to 1 mm for multiple reflection on the surface of a color reflector. Providing jaggednesses of about 400 nm to 1 mm for multiple reflection on the surface of a color reflector is cheap and effective low-reflection treatment, which is performed by molding, transfer, etching or the like of irregularities on the surface of a resin or coated film.

In addition to the above characteristics, the light-reflecting attraction unit 4 may be a reflector whose reflectance near the reflectance peak wavelength of light wavelength components of 380 to 600 nm is 10% or more. The light-reflecting attraction unit 4 is created by controlling the addition density of a coloring agent of the color reflector, and more specifically, by adjusting the thickness of color plastics or adjusting the thickness of a coated film of color coating on a transparent material such as a plastic plate or sheet.

The odor generation unit 5 uses an aqueous solution containing at least one of green leaf alcohol and green leaf aldehyde as an odor source and an odor to attract insects is generated by controlling the volatilization/transpiration density of the odor source through a regulator (not shown) or the like. Transpiration of the odor source may be natural transpiration, but supersonic transpiration or heating transpiration is easier to control. The density of the green leaf alcohol or green leaf aldehyde contained in the odor source is variable depending on the size of the field, but the dilution of aqueous solution of about 0.1 to 10% is particularly desirable. The insect pest-controlling apparatus 1 may use the light-reflecting attraction unit 4 impregnated with the same odor source as the odor generation unit 5, which improves the effect of attraction. Incidentally, the odor generation unit 5 may not be installed to curb rising manufacturing costs of the insect pest-controlling apparatus 1.

The trap 6 is constituted as a basin type, adhesive type, or fan type (suction type) or the like and traps diurnal agricultural insect pests attracted by the light irradiation unit 2, the light-reflecting attraction unit 4, and the odor generation unit 5. The trap 6 may be configured integrally with the light-reflecting attraction unit 4 like light-reflecting attraction unit 4 whose surface is coated with a pressure sensitive adhesive or an insecticidal unit configured to kill insects by electrocution.

Figure 5:
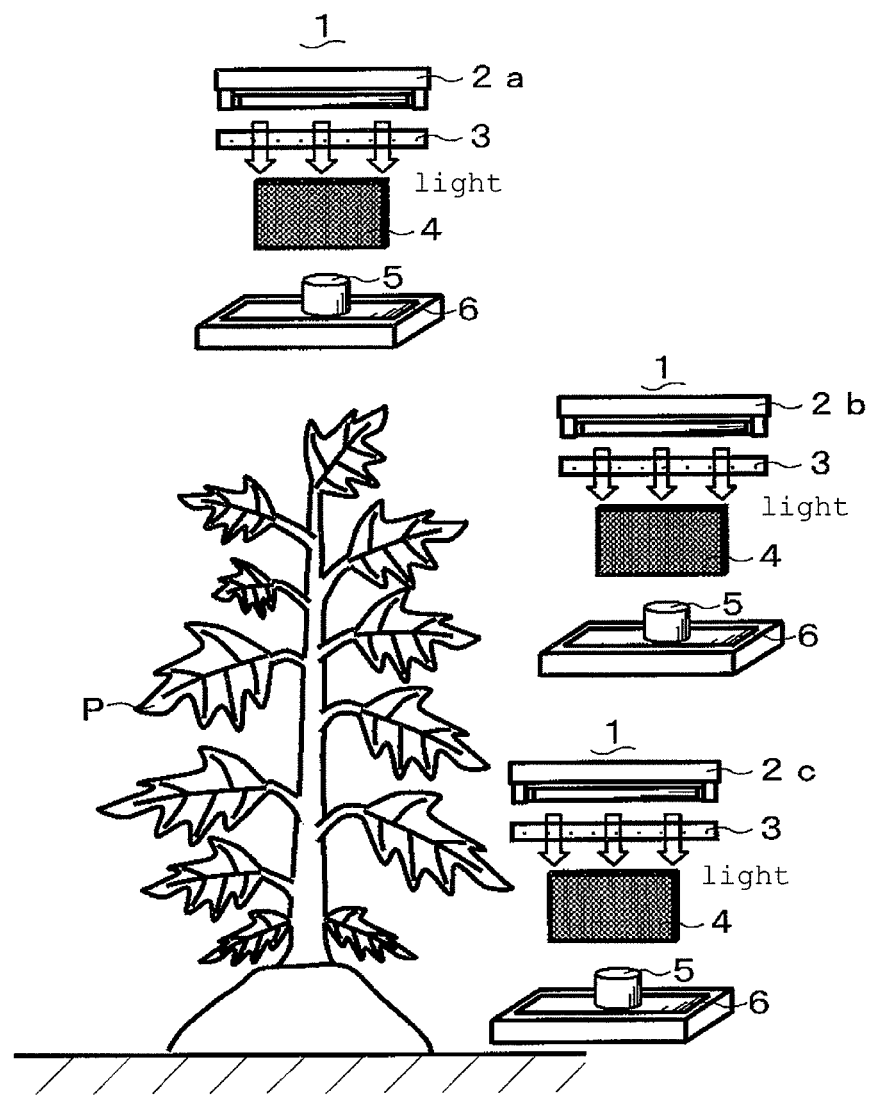
[FIG. 5]

When the plant P is planted and cultivated at a relatively high density, light is not sufficiently emitted to side and lower portions of the adjacent plants P due to the shadow of the plant P if the light irradiation unit 2 is simply installed above the plant P. Accordingly, there is a fear that it becomes more difficult to control insect pests in the side and lower portions of the plant P than other portions. In such a case, as shown in FIG. 5, it is desirable to install, in addition to the insect pest-controlling apparatus 1 disposed above the plant P, the similar insect pest-controlling apparatus 1 each in the side and lower portions of the plant P. Hereinafter, the light irradiation unit 2 above, in a side portion, and a lower portion of the plant P will be referred to an upper light irradiation unit 2a, a side light irradiation unit 2b, and a lower light irradiation unit 2c, respectively. The respective number of these insect pest-controlling apparatuses 1 is not limited to one and may be more than one.

Figure 6:
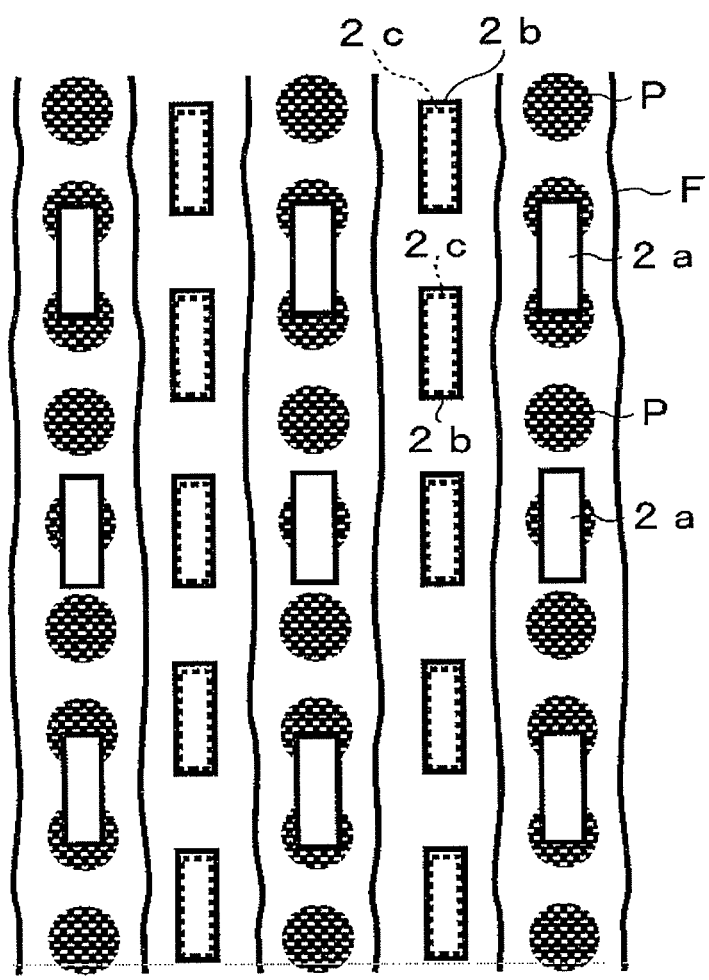
[FIG. 6]

Next, the plane arrangement of the light irradiation units 2a, 2b, 2c of the insect pest-controlling apparatus 1 will be described with reference to FIG. 6. If a plurality of plants P is planted by fitting to a ridge F, it is desirable to provide a plurality of upper light irradiation units 2a, side light irradiation units 2b, and lower light irradiation units 2c. The upper light irradiation unit 2a is installed at predetermined intervals along the ridge F. The side light irradiation unit 2b and lower light irradiation unit 2c are constituted of a fluorescent lamp made waterproof by, for example, being covered with a cylinder or the like and installed in parallel with the ridge F, that is, in parallel with a row of the plants P successively. The side light irradiation unit 2b and lower light irradiation unit 2c may also be constituted of a lighting apparatus of the hollow light guide system, an optical fiber system, or an EL apparatus having an elongated shape. The upper light irradiation unit 2a, the side light irradiation unit 2b and lower light irradiation unit 2c are installed by being arranged and thus, if the plant P is planted in parallel rows in a wide range, the side and lower portions of the plant P can efficiently be irradiated with the light.

The light irradiation time of the insect pest-controlling apparatus 1 is controlled by an illumination sensor or timer and the like, and the light is emitted mainly in the daytime.

The insect pest-controlling apparatus 1 may further use a xenon lamp emitting an artificial light such as white light in a combination to emit light not only in the daytime, but also in the nighttime by using both irradiation of the artificial light from the xenon lamp and irradiation of the light from the light irradiation units 2a, 2b, 2c simultaneously.

The light distribution and amount of light of the light irradiation units 2a, 2b, 2c may be adjusted by fitting to the growth of the plant P. For example, if the plant P has not yet grown in the initial growth stage and is still small, the amount of light with which the plant P is irradiated is decreased. To decrease the amount of light with which the plant P is irradiated, the spread of light distribution is suppressed by turning off the upper light irradiation unit 2a, turning on the side light irradiation unit 2b and lower light irradiation unit 2c, and further adjusting the mounting angle of the side light irradiation unit 2b and lower light irradiation unit 2c. When the plant P grows large, the upper light irradiation unit 2a, the side light irradiation unit 2b, and lower light irradiation unit 2c are turned on and the mounting angle of the sidelight irradiation unit 2b and lower light irradiation unit 2c is adjusted to spread the light distribution so that the amount of light with which the plant P is irradiated is increased. The method of adjusting the light distribution and amount of light of the side light irradiation unit 2b and lower light irradiation unit 2c is not limited to the above example and if the amount of light of the upper light irradiation unit 2a is small or the plant P requires a relatively large amount of light, the upper light irradiation unit 2a may be turned on in the initial growth stage.

The insect pest-controlling apparatus 1 is desirably installed in a plastic greenhouse and glass house for agriculture (hereinafter, referred to as a house) having a function to be able to cut ultraviolet rays, particularly UV-A from sunlight so that the effect of attracting insect pests can be made more reliable. If the insect pest-controlling apparatus 1 is used in such a house, UV-A of sunlight is cut so that attraction of insect pests by the insect pest-controlling apparatus 1 becomes more effective.

Table 1 shown below shows a result of experiment to attract and trap insect pests by light irradiation of a conventional insect trap lamp and by light irradiation of the light irradiation unit 2 of the insect pest-controlling apparatus 1 according to the present embodiment. In this experiment, the plant is a rose and the diurnal agricultural insect pest is the thrip. A UV-A lamp (manufactured by Panasonic Corporation, product number: FL20SBLK), which is a fluorescent lamp for insect trap having light wavelength components of 340 to 380 nm, is used as the conventional insect trap lamp. As the light irradiation unit 2 in the present embodiment, a UV-B lamp (manufactured by Panasonic Electric Works Co., Ltd., product number: YGRKX21799) having light wavelength components of 280 to 340 nm and a UV-C lamp (manufactured by Nissin Denki Kogyo Co., Ltd., product number: SX-20-128) having light wavelength components of 100 to 280 nm are combined. A transparent pressure sensitive adhesive sheet is used as the trap 6 for both cases of the UV-A lamp and the combination of the UV-B lamp and the UV-C lamp. This experiment is done in a house for seven days by turning on lamps in the daytime from sunrise to sunset.

TABLE 1

| Light source | Number of attracted/ trapped insect pests |
| --- | --- |
| UV-A lamp (20 W) | 12 insects |
| UV-B + UV-C lamps (20 W) | 139 insects |

As a result of the above experiment, the combination of the UV-B lamp and UV-C lamp has an attraction effect of about 11 times compared with the UV-A lamp. The light emitted by the light irradiation unit 2 contains light wavelength components that are not contained in sunlight and also light wavelength components that are contained in sunlight, but whose radiation is weak and therefore, diurnal agricultural insect pests are able to visually recognize the contrast of ultraviolet rays even under sunlight. Accordingly, diurnal agricultural insect pests can be attracted and trapped in large quantities in the daytime.

Table 2 shown below shows a result of experiment to attract and trap insect pests by a conventional reflector and by the light-reflecting attraction unit 4 of the insect pest-controlling apparatus 1 according to the present embodiment. In this experiment, the plant is a tomato and the diurnal agricultural insect pest is the aleyrod. A commercial yellow reflector (manufactured by Arysta LifeScience Corporation, product name: Holiver) whose reflectance of light wavelength components of 220 to 390 nm is 7% or more is used as the conventional reflector. Two kinds of yellow low-UV reflectors whose reflectances of light wavelength components of 220 to 390 nm are 5.0% and 3.8% are used as the light-reflecting attraction unit 4 in the present embodiment. A pressure sensitive adhesive with which the surface of a reflector is coated is used as the trap 6 for both cases of the commercial yellow reflector and the yellow low-UV reflectors. This experiment is done in a house for seven days.

TABLE 2

| Reflector | Number of attracted/ trapped insect pests |
| --- | --- |
| Commercial yellow reflector | 34 insects |
| Yellow low-UV reflector Reflector with surface diffusion: Reflectance 5.0% | 79 insects |
| Yellow low-UV reflector Reflector with surface diffusion: Reflectance 3.8% | 162 insects |

As a result of the above experiment, the yellow low-UV reflector whose reflectance of light wavelength components of 220 to 390 nm is 5.0% has an attraction effect of about two times compared with the commercial yellow reflector. The yellow low-UV reflector whose reflectance of light wavelength components of 220 to 390 nm is 3.8% has an attraction effect of about four times compared with the commercial yellow reflector. The light-reflecting attraction unit 4 in the insect pest-controlling apparatus 1 according to the present embodiment reflects almost no ultraviolet rays and therefore, the contrast of ultraviolet rays in the space increases compared with sunlight and so diurnal agricultural insect pests are strongly attracted to the light-reflecting attraction unit 4. Accordingly, diurnal agricultural insect pests can be attracted and trapped in large quantities in the daytime.

Table 3 shown below shows a result of experiment to attract and trap insect pests by a conventional reflector and by a combination of the conventional reflector and the odor generation unit 5 in the insect pest-controlling apparatus 1 according to the present embodiment. In this experiment, the plant is a tomato and the diurnal agricultural insect pest is the aleyrod. A commercial yellow reflector whose reflectance of light wavelength components of 220 to 390 nm is 7% or more is used as the conventional reflector. A heating transpiration system whose odor attraction source is a 1% dilution solution of green leaf alcohol is used as the odor generation unit 5. A pressure sensitive adhesive with which the surface of the commercial yellow reflector is coated is used as the trap 6. This experiment is done in a house for seven days.

TABLE 3

| Attraction source | Number of attracted/trapped insect pests |
| --- | --- |
| Commercial yellow reflector | 28 insects |
| Commercial yellow reflector + green leaf alcohol (diluted to 1%) spraying | 89 insects |

As a result of the above experiment, the combination of the commercial yellow reflector and the odor generation unit 5 whose odor source is a 1% dilution solution of green leaf alcohol has an attraction effect of about three times compared with the commercial yellow reflector only. The insect pest-controlling apparatus 1 according to the present embodiment attracts diurnal agricultural insect pests from places away from the range in which diurnal agricultural insect pests can visually recognize the contrast of ultraviolet rays by the odor generated by the odor generation unit 5 and therefore can attract and trap diurnal agricultural insect pests in larger quantities in the daytime.

Table 4 shown below shows a result of experiment to attract and trap insect pests by a conventional reflector or by a combination of the light irradiation unit 2, the light-reflecting attraction unit 4, and the odor generation unit 5 of the insect pest-controlling apparatus 1 according to the present embodiment. In this experiment, the plant is an eggplant and the diurnal agricultural insect pest is the thrip. A commercial yellow reflector (manufactured by Arysta LifeScience Corporation, product name: Holiver) whose reflectance of light wavelength components of 220 to 390 nm is 7% or more is used as the conventional reflector. A UV-B lamp having light wavelength components of 280 to 340 nm and a UV-C lamp having light wavelength components of 100 to 280 nm are used as the light irradiation unit 2. A blue low-UV reflector whose reflectance of light wavelength components of 220 to 390 nm is 3.8% is used as the light-reflecting attraction unit 4. A heating transpiration system whose odor attraction source is a 3% dilution solution of green leaf alcohol is used as the odor generation unit 5. A pressure sensitive adhesive with which the surface of a reflector is coated is used as the trap 6 for both cases of the commercial blue reflector and the blue low-UV reflector. This experiment is done in a house for seven days by turning on lamps in the daytime from sunrise to sunset.

TABLE 4

| Attraction source | Number of attracted/trapped insects |
| --- | --- |
| Commercial blue reflector | 26 insects |
| UV-C + UV-B lamps, 20 W + blue low-UV reflector (Reflector with surface diffusion: Reflectance 3.8%) + green leaf alcohol (diluted to 3%) spraying | 563 insects |

As a result of the above experiment, the combination of the UV-B and UV-C lamps, the blue low-UV reflector, and the odor generation unit 5 whose odor attraction source is a 1% dilution solution of green leaf alcohol has an attraction effect of about 20 times compared with the commercial blue reflector. By combining the light irradiation unit 2 emitting ultraviolet rays (UV-B, UV-C) and the light-reflecting attraction unit 4 reflecting almost no ultraviolet rays (UV-A, UV-B, UV-C), the insect pest-controlling apparatus 1 according to the present embodiment can increase the contrast of ultraviolet rays in the space. Accordingly, the insect pest-controlling apparatus 1 strongly attracts diurnal agricultural insect pests by the light-reflecting attraction unit 4 and therefore can attract and trap diurnal agricultural insect pests in large quantities in the daytime. Moreover, the insect pest-controlling apparatus 1 according to the present embodiment attracts diurnal agricultural insect pests within the range in which diurnal agricultural insect pests can visually recognize the contrast of ultraviolet rays due to the light irradiation unit 2 and the light-reflecting attraction unit 4 and further attracts diurnal agricultural insect pests from places away from the range in which diurnal agricultural insect pests can visually recognize the contrast of ultraviolet rays by the odor generation unit 5 and therefore can attract and trap diurnal agricultural insect pests in larger quantities in the daytime.

Table 5 shown below shows a result of experiment to attract and trap insect pests by a conventional reflector or by the light-reflecting attraction unit 4 of the insect pest-controlling apparatus 1 according to the present embodiment. In this experiment, the plant is a tomato and the diurnal agricultural insect pest is the aleyrod. A commercial yellow reflector whose reflectance of light wavelength components of 220 to 390 nm is 7% or more is used as the conventional reflector. Two kinds of reflectors, a yellow low-UV reflector whose reflectance of light wavelength components of 220 to 390 nm is 3.8% and a yellow low-UV reflector whose reflectance of light wavelength components of 220 to 390 nm is 3.7% and whose transmittance near the transmittance of light wavelength components of 380 to 600 nm is 13%, are used as the light-reflecting attraction unit 4. A pressure sensitive adhesive with which the surface of a reflector is coated is used as the trap 6 for both cases of the commercial yellow reflector and the yellow low-UV reflector. This experiment is done in a house for seven days by turning on lamps in the daytime from sunrise to sunset.

TABLE 5

| Reflector | Number of attracted/trapped insect pests |
| --- | --- |
| Commercial yellow reflector | 56 insects |
| Yellow low-UV reflector (Reflector with surface diffusion: Reflectance 3.8%) | 238 insects |
| Yellow low-UV reflector whose transmittance near the transmittance peak wavelength of light wavelength components of 380 to 600 nm is 13% (Reflector with surface diffusion: Reflectance 3.7%) | 345 insects |

As a result of the above experiment, the yellow low-UV reflector whose reflectance of light wavelength components of 220 to 390 nm is 3.8% has an attraction effect of about four times compared with the commercial yellow reflector. The yellow low-UV reflector whose reflectance of light wavelength components of 220 to 390 nm is 3.7% and whose transmittance near the transmittance of light wavelength components of 380 to 600 nm is 13% has an attraction effect of about six times compared with the commercial yellow reflector. Accordingly, visible light is also emitted from the side of the light-reflecting attraction unit 4 on which the sun is not faced after the light-reflecting attraction unit 4 being transmitted by sunlight and diurnal agricultural insect pests can be attracted also on the side on which the sun is not faced and therefore, the insect pest-controlling apparatus 1 according to the present embodiment can attract and trap diurnal agricultural insect pests in larger quantities in the daytime.

Incidentally, the present invention is not limited to the above embodiment and various modifications can be made without altering the spirit and scope of the present invention. For example, if the illumination of UV-B and UV-C is strong, the human body may be damaged and therefore, the light distribution may be controlled so that a worker is not irradiated with light from the light irradiation unit 2 by installing a screen or person sensing sensor switch in the house and electrically connecting the screen or person sensing sensor switch to the insect pest-controlling apparatus 1. With this control, safety of the worker in the house can be secured.

The present application is based upon Japanese Patent Application No. 2008-269896, the entire contents of which are incorporated herein by reference.

The present invention is sufficiently described by the embodiment with reference to appended drawings, but it is obvious to those skilled in the art that various alterations and modifications can be made. Therefore, such alterations and modifications should be understood to be included in the scope of the present invention without deviating from the scope of the invention.

What is claimed is:

1. An insect pest-controlling apparatus comprising:
   a light-reflecting attraction unit that reflects sunlight;
   a trap that traps insects attracted by the light reflected by the light-reflecting attraction unit, the light-reflecting attraction unit comprising a reflector whose reflectance of light having wavelength components of 220 to 390 nm is 5% or less,
   wherein the transmittance of the reflector near a transmittance peak wavelenght of light having wavelength components of 380 to 600 nm is 10% or more;
   a light irradiation unit that emits light to attract the insects, wherein the light emitted by the light irradiation unit is within at least a region of a wavelength ranging from 250 to 330 nm, and
   wherein the light irradiation unit is controlled so that a total quantity of the light in the wavelength range of 250 to 330 nm on an emission surface of the light irradiation unit is 100 $\mu W/cm^2$ or more; and
   a filter,
   wherein the filter is configured so that the light having a wavelength components of 340 to 380 nm of the light emitted from the light irradiation unit are not transmitted.

2. The insect pest-controlling apparatus according to claim 1, further comprising an odor generation unit that generates an odor to attract the insects, wherein the odor generation unit uses an aqueous solution containing at least one of green leaf alcohol and green leaf aldehyde as an odor source.

3. The insect pest-controlling apparatus according to claim 2, further comprising an odor generation unit that generates an odor to attract the insects, wherein the odor generation unit uses an aqueous solution containing at least one of green leaf alcohol and green leaf aldehyde as an odor source.

4. The insect pest-controlling apparatus according to claim 1, wherein the trap traps the insects attracted by the light emitted from the light irradiation unit.

5. The insect pest-controlling apparatus according to claim 4, further comprising an odor generation unit that generates an odor to attract the insects, wherein the odor generation unit uses an aqueous solution containing at least one of the green leaf aldehyde as an odor source.

6. The insect pest-controlling apparatus according to claim 1, wherein the light-reflecting attraction unit is impregnated with an odor source that attracts insects.

7. The insect pest-controlling apparatus according to claim 1, wherein the filter is separate and distinct from the emission surface of the light irradiation unit, and wherein the filter is positioned between the light irradiation unit and light-reflecting attraction unit.

* * * * *